Oct. 25, 1966  D. COSTES  3,280,905
HEAT EXCHANGE APPARATUS
Filed April 4, 1963  2 Sheets-Sheet 1

United States Patent Office 3,280,905
Patented Oct. 25, 1966

3,280,905
HEAT EXCHANGE APPARATUS
Didier Costes, Paris, France, assignor to Commissariat a l'Énergie Atomique, Paris, France
Filed Apr. 4, 1963, Ser. No. 270,675
Claims priority, application France, Apr. 13, 1962, 894,486
5 Claims. (Cl. 165—145)

The present invention relates to a heat exchange apparatus for effecting heat transfer between two fluids, of the type comprising a general casing inside which the first fluid circulates and which withstands the pressure of said fluid and an internal circuit which is disposed in the interior of said general casing and through which the second fluid circulates. The invention applies especially to nuclear reactors in which the biological shield and pressure vessel are accordingly designed to contain the general casing of said heat exchange apparatus.

The heat exchangers of the type defined above and which are in use at the present time are subject to serious disadvantages when constructed in large sizes. The elements of the internal circuit are inserted, after construction of the containment vessel, through an opening designed to be sealed off and formed in the pressure vessel, which is obviously very large. Considerations relating to the structural design and strength of the pressure vessel make it necessary to limit said opening to a small size. Since the heat exchange elements are constructed in the shape of long cylinders which are placed side by side in the interior and joined together by effecting all the requisite connections, it is necessary to arrange in the line of extension of the opening and towards the exterior a free space having at least the length of one heat exchange element, and it is not possible to remove any heat exchange element for repair purposes without also removing all the elements which are located between that element and the opening, unless provision is made for very substantial dead spaces in the interior of the vessel.

The above-mentioned disadvantages of those heat exchangers which are in use at the present time are particularly serious if it is desired to place a heat exchanger within the same pressure vessel as the core of a nuclear reactor in order to achieve a reactor design of the so-called "integrated exchanger" type; the pressure vessel of a reactor is frequently built in the shape of a long cylindrical container, this shape being an advantage, especially for the purpose of prestressed concrete construction. An arrangement can accordingly be proposed which is of practical interest both from the viewpoint of construction cost and safety. This arrangement consists in the vertical alignment inside the vessel, from the top downwards, of the nuclear fuel charge machine, the reactor core, a support plate which forms a radiation shield and the heat exchanger, there being caused to circulate through the combined assembly a thermal fluid which is returned to the top portion of the vessel by means of pumps or blowers.

In this arrangement, the heat exchange elements can only be introduced from the side or from underneath, which makes it necessary to reduce the length of said elements. Furthermore, in view of the fact that the operation of the reactor is conditioned by the operation of the heat exchanger, it must be made possible to replace any defective heat exchange element rapidly and therefore without any rehandling of a large number of elements. However, pressurized space is costly, and for this reason it is necessary to avoid making provision in the interior of the vessel for handling passageways which would consume a substantial proportion, for example one-half, of the available volume.

The main object of the invention consists in the design of a heat exchange apparatus which provides a large heat-transfer surface area per unit volume and which is capable of being subjected to a substantial pressure difference between the two fluids, and in which the internal circuit can be readily assembled or disassembled using elements of small dimensions.

A further object of the invention which is related to the first consists in the design of a nuclear reactor which is equipped with a heat exchange apparatus mounted in the interior of the pressure vessel containing the reactor core, in which repair and maintenance work can be performed on said apparatus in order to replace certain elements without putting the entire apparatus out of service.

The heat exchange apparatus in accordance with the invention comprises a general casing or shell inside which a first fluid circulates and which withstands the pressure of said fluid, and an internal circuit which is disposed in the interior of said general casing and through which circulates a second fluid, the internal circuit being constituted by elements which are at least substantially identical to each other, the length and the transverse cross-section of said elements constituting a small fraction of the length and transverse cross-section of the casing, said elements being assembled together by removable fluid-tight coupling means in adjacent rows which each constitute one unitary circuit, the dimensions of the casing being such that there is formed inside said casing a free space having a length at least equal to that of one element between the end of each row and the oppositely facing wall of said casing.

The reactor in accordance with the invention comprises a cylindrical pressure vessel which contains the reactor core, a biological shield through which extend passages designed to accommodate conduits for the circulation of the thermal fluid, and a heat exchange apparatus of the type heretofore described, as arranged in alignment along the axis of said pressure vessel.

In a preferred arrangement, the reactor core is placed above the heat exchange apparatus and the hot thermal fluid circulates from the bottom upwards, floods the exchanger elements and returns to the core through conduits which are disposed around the heat exchanger unit and around the core whilst the fluid which is contained in the interior of the elements circulates from the bottom upwards through the heat exchanger apparatus.

The present invention will be more clearly understood from a perusal of the description which follows below, reference being made therein to the accompanying drawings, in which various forms of embodiment of the invention are shown by way of example without implied limitation, and in which.

Figure 5:
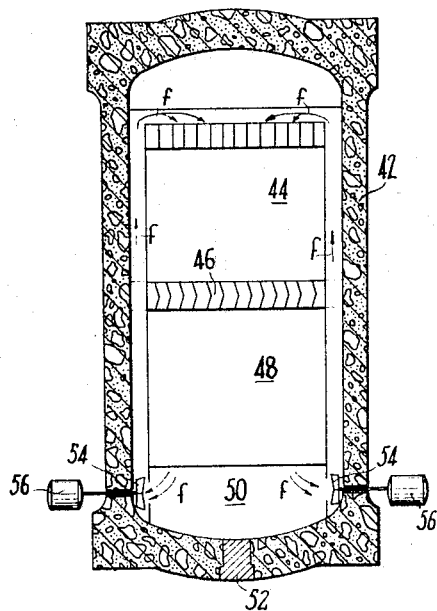
FIG. 5 shows diagrammatically in longitudinal cross-section a nuclear reactor fitted with an integrated heat-exchange apparatus in accordance with the invention.
Figure 6:
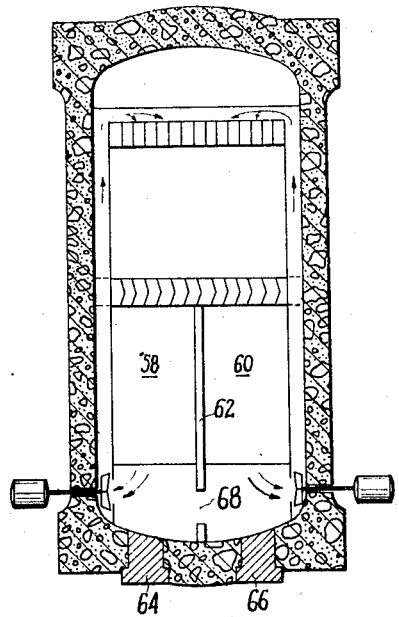

FIG. 6, which is similar to FIG. 5, shows a nuclear reactor fitted with an integrated heat-exchange apparatus in accordance with an alternative form.

Figure 1A:
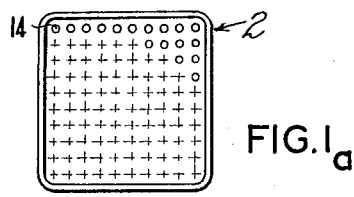
FIGS. 1a and 1b are diagrammatic views of a first type of heat exchange element, taken respectively from above and in cross-section in a plane which passes along the axis.
Figure 1B:
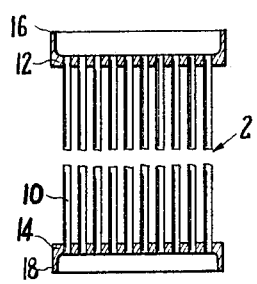
Figure 2:
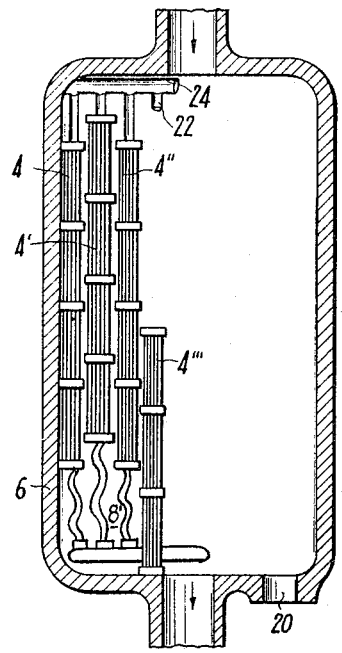
FIG. 2 is a diagrammatic view taken in longitudinal cross-section and showing the general arrangement of a heat exchange apparatus which is fitted with elements of the type shown in FIG. 1.

FIGS. 1a and 1b show a heat exchanger element 2 in accordance with the invention which is intended to be assembled together with identical elements in a row which consists, for example, of three or four elements, such as the rows 4, 4', 4" and 4"' of FIG. 2. These rows are juxtaposed inside a pressure vessel 6, a free space 8 being formed between the end of the row and the wall of the vessel. When disengaged from its various connections, one row can accordingly slide along its axis and come into the position in which the row 4"' is located as shown in FIG. 2 so as to permit the disassembly of its first element. All the elements can thus be successively removed.

The exchange element which is illustrated by way of example in FIG. 1 consists of 81 exchange tubes such as the tube 10, each exchange tube being joined to two square header plates 12 and 14. Said header plates are provided with peripheral flanges 16 and 18 intended for the purpose of coupling elements 2 which are aligned by means of butt welds.

In the juxtaposed assembly of rows, the obstructions which correspond to the square header plates such as the header plates 12 and 14 must be displaced so as to permit the circulation of fluid and to play the part of baffles, thereby making it possible to intensify the heat transfer. There can be added to the said obstructions auxiliary baffles, of sheet iron, for example (not shown in the drawings).

The assembly of the exchanger elements in the interior of the pressure vessel 6 is readily discernible from FIG. 2 in which three rows 4, 4' and 4" are shown in position while the fourth 4"' is in process of assembly. The lowermost element of the row 4"' has been inserted through the opening 20 and is presented for welding beneath the row 4"'. The steam header 22 of said row is located on top in readiness and is branched, for example, on a general steam header 24. The lower circuit for feeding the rows which is usually constituted by deformable pipes of small diameter. The rows of elements are designed to be suspended from the top, for example, from the general steam header 24; it can be seen that the expansion of each row is not interfered with.

When once the cross-sectional area of the pressure vessel has been entirely filled (if necessary with full prismatic elements in the vicinity of the wall), all the hot gas which is supplied from the top flows in a predetermined pattern over the heat transfer surfaces. It will be noted that the dimensions and temperature differences which are met with in nuclear engineering result in tube diameters which are smaller than in conventional heat exchanger designs.

Figure 3:
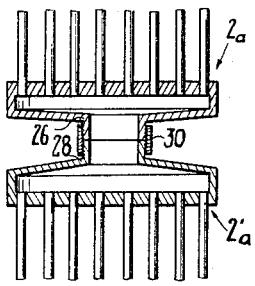
FIG. 3 is a diagrammatic sectional view, on a plane which passes along the axis, of the extremities of two elements of a second type and of the device for coupling said extremities.

FIG. 3 shows two end-portions 2a and 2a' of heat exchange elements in accordance with an alternative form. Said elements are fitted with terminal connectors 26 and 28 which have a small diameter and which are provided with screw-threads of different pitch (usually in opposite directions). A ring 30 provided with two screw-threads and fitted with sealing joints permits the assembly of the two end-portions. By means of this constructional arrangement, the elements can readily be substituted. The same result could be obtained as a result of the use of flange-couplings.

Figure 4:
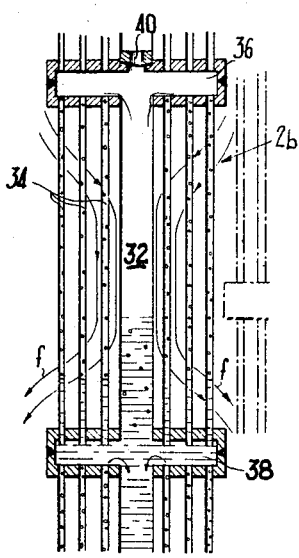
FIG. 4 is a diagrammatic cross-section, taken in a plane which passes along the axis, of a boiler element and of the extremities of the two elements which are coupled thereto.

There has been shown diagrammatically in FIG. 4 the circulation of fluids in the case of a water boiler element 2b, which constitutes an alternative form of the element 2 of FIG. 1. The hot gas which constitutes the first fluid flows in the downward direction along the general path which is indicated by the arrows f. The obstructions which are formed by the header plates of adjacent rows (as shown in chain-dotted lines) cause deviations in the fluid streamlines which are favorable to the processes of heat transfer.

The heated water flows from the bottom upwards inside the element and is vaporized therein. The element 2b comprises a central tube 32 having a diameter which is distinctly larger than that of the other tubes 34. The heating which is more intense inside the tubes 34 than inside the tube 32 creates a natural circulation with upward motion of water-steam mixture inside the tubes 34, separation of water and steam in the top header 36 which is formed of two header plates welded together, and downward flow of water through the tube 32 towards the bottom header 38 for recycling. The heat exchanger element which is located beneath the element 2b can also give rise to a boiling process; in this case the bubbles which pass out of the small tubes 34 are preferably directed towards the central tube 32 and rise up therein while scarcely offering any hindrance to the downflowing water. The tubes 34 of the upper element are thus fed with water without steam, thereby greatly improving the heat transfer process. This result is obtained by permitting the ends of the tubes 34 to project into the interior of the lower header 38, whereas the ends of the tube 32 is formed flush with said header. The arrangement noted above is illustrated in the case of the exchange element 2b.

When the top elements play the part of superheaters, it is an advantage to obstruct the circulation of steam in the large central tube, which can be retained for constructional facilities (for example with a view to forming a passage for a radiation source which is intended for the purpose of testing the welds between elements). It is possible to employ for the purpose of throttling the flow a diaphragm 40 which is lowered inside the central tube, then fixed in position.

FIG. 5 illustrates a nuclear reactor which comprises a pressure vessel 42, for example a shell of prestressed concrete fitted with an internal liner, an active core 44, a support plate 46 which forms a partial shield against radiation so that the heat exchanger unit is thereby made accessible shortly after shut-down of the reactor, a heat exchanger unit 48 constructed in accordance with the arrangement which is shown in FIG. 4, and a bottom chamber 50 for the assembly of elements. Access to the chamber 50 through the vessel 42 is provided by an opening fitted with a plug 52. The primary fluid which is cooled in the heat exchanger unit is returned upwards along the periphery of the heat exchanger unit and of the core by means of pumps or blowers 54, along the path indicated by the arrows f. For the sake of greater simplicity, the water and steam conduits have not been illustrated in the drawings. For safety reasons, it is preferable to mount the pumps 54 inside the shell 42. The said pumps are driven, for example, by external motors 56, the rotary shafts of which pass through the vessel structure through sealing joints of known type.

The arrangements which have been described in the foregoing would again be met with in a heat exchanger unit located above the reactor core. In this case, the heat exchanger elements can be either introduced or withdrawn through the pressure vessel wall at the base of the assembly chamber after being placed in a horizontal position.

The juxtaposed rows of heat exchange elements form as a result of their staggered relation at least two groups from the point of view of the thermal behavior of said elements. Different pressures, flow rates and water levels can be employed in the various groups so as to obtain the maximum power recovery. The top steam headers can be branched on the general headers only after having been passed through the pressure vessel wall, thereby reducing the gravity of possible accidents in the interior of the vessel.

In the case of a nuclear reactor, it is usually necessary to remove a certain quantity of heat after shutdown of the reactor. Accordingly, a flow of air can be caused to circulate through the reactor core after having been previously cooled by an exchanger which can be located outside the shell; this expedient makes it possible to carry out maintenance or replacement operations in the main heat exchanger apparatus. However, this solution entails the addition of an external heat exchanger.

In order to eliminate this requirement, it is possible to subdivide the main heat exchanger into two chambers 58 and 60 (as shown in FIG. 6) by means of a wall 62 which does not have to withstand pressure. The chambers 58 and 60 are provided respectively with corresponding access holes 64 or 66 for maintenance and replacement operations.

If it is desired, for example, to operate inside the chamber 58, the reactor is shut down and the pressure therein is reduced to atmospheric pressure. The blowers which open into the chamber 58 are stopped, and the operating staff then quickly seal off the blower openings as well as a communication opening 68 which may be formed in the wall 62. Any exchange between the atmosphere of the chamber 58 and the coolant circuit is thus excluded, thereby making it possible to operate under the desired conditions. Subsequent start-up can take place after the reverse operations have been performed.

The chambers 58 and 60 which are shown to be of equal volume in FIG. 6 can evidently have very different capacities.

The invention is obviously not limited to the forms of embodiment which have been described by way of non-limitative example and it must accordingly be understood that this Patent is intended to comprise within its scope all equivalent arrangements.

What I claim is:

1. Heat exchange apparatus for heat transfer between a first fluid and a second fluid, a casing, an internal chamber defined by said casing constructed to withstand the pressure of said first fluid and an internal circuit in said chamber for said second fluid, said internal circuit comprising a plurality of substantially identical elongated tubular units, the length and cross sectional dimensions of said units being small as compared to the length and cross sectional dimensions of said chamber, dismountable fluid-tight coupling means for removably assembling said units in end to end relationship, a plurality of parallel adjacent tubular rows each formed by a plurality of said units, in end to end relationship, collector means, means for removably connecting each of said rows in parallel relationship to said collector means, the length of said rows and the length of said chamber being so proportioned that a space free of said units and having a length at least equal to that of one of said units is provided between one end of each of said rows and the adjacent wall of said casing.

2. Heat exchange apparatus as described in claim 1, each of said units comprising two terminal header-plates, a plurality of tubes connecting said header-plates, successive units of said rows being coupled together by said coupling means on said header-plates, and adjacent rows of aligned units being longitudinally offset whereby said first fluid circulates in a generally longitudinal direction while passing around said header-plates.

3. Heat exchange apparatus as described in claim 2, said header-plates forming a header chamber.

4. Heat exchange apparatus as described in claim 1, said units comprising two plates connected by a central tube and by a plurality of lateral tubes of smaller diameter than that of said central tube.

5. Heat exchange apparatus as described in claim 1, said second fluid being a vaporizable liquid, one of said plates being a bottom plate, a header chamber having a top wall formed by said bottom plate, each lateral tube of certain of said units projecting beyond said bottom plate to partially obstruct the flow of steam from said second fluid through said lateral tubes from said header chamber.

References Cited by the Examiner

UNITED STATES PATENTS

| | | | |
|---|---|---|---|
| 2,306,738 | 12/1942 | MacGregor | 122—510 |
| 2,557,356 | 6/1951 | Little | 165—72 |
| 2,621,900 | 12/1952 | Borg | 165—72 |
| 2,825,463 | 3/1958 | Thomas | 285—137 X |
| 2,861,781 | 11/1958 | Cohen | 165—96 X |
| 2,946,732 | 7/1960 | Wootton | 176—31 |
| 3,070,536 | 12/1962 | Taylor et al. | 176—60 |
| 3,077,443 | 3/1963 | Camack et al. | 204—154.23 |
| 3,104,652 | 9/1963 | Tillequin et al. | 122—510 X |

FOREIGN PATENTS

| | | |
|---|---|---|
| 558,568 | 7/1957 | Belgium. |
| 865,128 | 2/1941 | France. |
| 1,021,515 | 12/1957 | Germany. |
| 814,057 | 5/1959 | Great Britain. |

ROBERT A. O'LEARY, *Primary Examiner.*

CARL D. QUARFORTH, L. EDWAYNE RUTLEDGE, CHARLES SUKALO, *Examiners.*

W. T. HOUGH, T. W. STREULE, *Assistant Examiners.*